(12) United States Patent
Awata et al.

(10) Patent No.: US 8,979,204 B2
(45) Date of Patent: Mar. 17, 2015

(54) SEAT BACKBOARD AND VEHICLE SEAT

(75) Inventors: Shinji Awata, Aichi-gun (JP); Hideki Kobayashi, Miyoshi (JP); Hisaya Mori, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/806,967

(22) PCT Filed: Jun. 16, 2011

(86) PCT No.: PCT/JP2011/063837
§ 371 (c)(1),
(2), (4) Date: Dec. 26, 2012

(87) PCT Pub. No.: WO2012/172674
PCT Pub. Date: Dec. 20, 2012

(65) Prior Publication Data
US 2014/0084661 A1    Mar. 27, 2014

(51) Int. Cl.
*A47C 7/00* (2006.01)
*B60N 2/58* (2006.01)
*B60N 2/68* (2006.01)
*B60N 2/70* (2006.01)
*B60N 2/72* (2006.01)

(52) U.S. Cl.
CPC ............ *B60N 2/5816* (2013.01); *B60N 2/5825* (2013.01); *B60N 2/68* (2013.01); *B60N 2/686* (2013.01); *B60N 2/7094* (2013.01); *B60N 2/72* (2013.01)
USPC .................. 297/440.2; 297/218.3; 297/218.5; 297/452.59

(58) Field of Classification Search
USPC ........ 297/440.2, 218.3, 218.5, 452.18, 452.2, 297/440.22, 218.1, 452.55, 452.59
See application file for complete search history.

(56) References Cited

U.S. PATENT DOCUMENTS

| | | | | |
|---|---|---|---|---|
| 5,407,248 A | * | 4/1995 | Jay et al. | 297/284.1 |
| 5,503,454 A | * | 4/1996 | Sakamoto | 297/218.1 |
| 5,556,168 A | * | 9/1996 | Dinsmoor et al. | 297/440.2 |
| 5,593,211 A | * | 1/1997 | Jay et al. | 297/383 |
| 6,095,611 A | * | 8/2000 | Bar et al. | 297/440.21 |
| 6,375,268 B2 | * | 4/2002 | Okazaki et al. | 297/452.18 |
| 7,188,902 B1 | * | 3/2007 | Chen | 297/357 |
| 7,222,915 B2 | * | 5/2007 | Philippot et al. | 297/216.13 |
| 7,857,394 B2 | * | 12/2010 | Whelan et al. | 297/440.2 |
| 8,366,146 B2 | * | 2/2013 | Yamaki et al. | 280/730.2 |

(Continued)

FOREIGN PATENT DOCUMENTS

| | | | | |
|---|---|---|---|---|
| EP | 550774 A1 | * | 7/1993 | B60N 2/24 |
| FR | 2 947 775 A1 | | 1/2011 | |

(Continued)

*Primary Examiner* — David E Allred
(74) *Attorney, Agent, or Firm* — Oliff PLC (57) ABSTRACT

In a seat backboard, a backboard section is formed with a size that enables it to pass through between left and right side frames of a seatback frame. Coupling fixing sections are also provided at the two seat width direction sides of the backboard section, the coupling fixing sections engaging with the front side of the side frames and supported by the side frames. The seat backboard can thereby be attached to the seatback frame from the seat front side, and the degrees of freedom for design can be increased. The seat backboard is also provided with a cover anchor section to which outer periphery anchor portions provided to a seat cover are anchored.

10 Claims, 5 Drawing Sheets

(56) References Cited

U.S. PATENT DOCUMENTS

| | | | | |
|---|---|---|---|---|
| 8,708,418 | B2* | 4/2014 | Mizobata | 297/452.56 |
| 2004/0000804 | A1* | 1/2004 | Groth | 297/284.4 |
| 2006/0138830 | A1 | 6/2006 | Liu | |
| 2010/0201178 | A1* | 8/2010 | Mizobata | 297/452.35 |
| 2013/0134749 | A1* | 5/2013 | Awata et al. | 297/216.13 |
| 2014/0049090 | A1* | 2/2014 | Mori et al. | 297/452.49 |
| 2014/0070594 | A1* | 3/2014 | Awata et al. | 297/452.48 |
| 2014/0225352 | A1* | 8/2014 | Awata et al. | 280/728.2 |

FOREIGN PATENT DOCUMENTS

| | | |
|---|---|---|
| JP | U-63-071800 | 5/1988 |
| JP | U-1-126145 | 8/1989 |
| JP | U-2-96939 | 8/1990 |
| JP | A-6-304350 | 11/1994 |
| JP | A-8-256874 | 10/1996 |
| JP | A-8-323073 | 12/1996 |
| JP | A-2000-25497 | 1/2000 |
| JP | A-2000-189294 | 7/2000 |
| JP | A-2002-211299 | 7/2002 |
| JP | A-2003-054301 | 2/2003 |
| JP | A-2003-135201 | 5/2003 |
| JP | A-2006-320611 | 11/2006 |
| JP | A-2010-005158 | 1/2010 |
| JP | A-2010-057855 | 3/2010 |
| JP | A-2010-68901 | 4/2010 |
| JP | A-2010-142530 | 7/2010 |
| JP | A-2010-172469 | 8/2010 |
| WO | WO 2006/095455 A1 | 9/2006 |
| WO | WO 2013/030666 A2 | 3/2013 |

* cited by examiner

SEAT BACKBOARD AND VEHICLE SEAT

TECHNICAL FIELD

The present invention relates to a seat backboard and vehicle seat employing the same.

BACKGROUND ART

In a vehicle seat described in Japanese Patent Application Laid-Open (JP-A) No. 2010-5158 a backboard is attached to an indentation portion on the back face of a seatback to prevent the seatback from getting dirty.

DISCLOSURE OF INVENTION

Technical Problem

However, in a vehicle seat such as the one referred to above, there is room for improvement from the standpoint of raising degrees of freedom in design, including for example in assembly processes, since the backboard cannot be attached to the seatback other than from the seat rear side. Also, in a vehicle seat such as the one referred to above, the fixing structure for a seat cover is complicated, since generally the seat cover is fixed to for example seatback springs using such as hog rings.

In consideration of the above circumstances an object of the present invention is to obtain a seat backboard and vehicle seat capable of raising the degrees of freedom in design and capable of simplifying the fixing structure of the seat cover.

Solution to Problem

A seat backboard of a first aspect of the invention integrally includes, or substantially integrally including: a backboard section that is disposed at a back face of a seatback of a vehicle seat and that is formed with a size enabling the backboard section to pass between a pair of left and right side frames of a seatback frame; a pair of left and right frame attachment sections provided further to a seat width direction outer side than seat width direction, which engage with a front side of the pair of side frames and are supported by the pair of side frames; a cover fixing section that is disposed at the back face side of the seatback and to which a seat cover that covers a surface of a seatback pad is fixed.

In the seat backboard of the first aspect, the backboard section disposed at the back face of the seatback is formed with a size enabling the backboard section to pass between the pair of left and right side frames of the seatback frame. The frame attachment sections are also provided further to the seat width direction outside than the seat width direction ends of the backboard section, engage with the front side of the pair of side frames and are supported by the side frames. The seat backboard can therefore be attached to the seatback frame from the seat front side, raising the degrees of freedom for design. Moreover, in the seat backboard the cover fixing section is provided disposed on the back face side of the seatback, and a seat cover is fixed to the cover fixing section. The seat cover fixing structure can thereby be simplified in comparison to conventional seat cover fixing structures employing for example hog rings.

A seat backboard according to a second aspect of the present invention is the seat backboard of the first aspect wherein the cover fixing section comprises a cover anchor section that engages with an anchored portion provided at the seat cover.

In the seat backboard of the second aspect. the seat cover is anchored to the cover anchor section through the anchored portion by the anchored portion provided to the seat cover engaging with the cover anchor section disposed to the back face side of the seatback. The seat cover anchoring operation can thereby be made simple.

A seat backboard of a third aspect of the invention is the seat backboard of the second aspect wherein the cover anchor section is open towards a seat rear side and the anchored portion is inserted into and anchored to the cover anchor section from the seat rear side.

In the seat backboard of the third aspect, the anchored portion provided to the seat cover is inserted from the seat rear side into the cover anchor section that is open towards the seat rear side. The seat cover is thereby anchored to the cover anchor section through the anchored portion. Since it suffices to simply insert the anchored portion into the cover anchor section the seat cover anchoring operation can be accomplished extremely simply. Moreover, since the cover anchor section is open towards the seat rear side, in cases where a seat backboard is molded such as by injection molding a resin, for example, the cover anchor section can be made without what is referred so as an undercut in the mold withdrawal direction when forming the back face (design face) of the backboard section. Good molding properties for the seat backboard can accordingly be achieved.

The seat backboard according to a fourth aspect of the invention is the seat backboard of the third aspect wherein an opening portion of the cover anchor section and a back face of the backboard section are disposed in the same plane as each other.

In the seat backboard of the fourth aspect, the opening portion of the cover anchor section for inserting the anchored portion provided to the seat cover is disposed in the same plane as the back face of the backboard section. Any step formed between the seat cover anchored through the anchored portions to the cover anchor section and the back face of the backboard section can thereby be reduced, and a good appearance can be achieved for the back face side of the seatback. Note that in the fourth aspect "in the same plane as" does not necessarily mean strictly in the same plane, as long as they are so to such an extent as to enable the above effect to be obtained (substantially in the same plane).

A seat backboard according to a fifth aspect of the present invention is the seat backboard of the second aspect wherein the cover anchor section extends along a top end portion and two seat width direction end portions of the backboard section.

In the seat backboard of the fifth aspect, the seat cover can be anchored neatly along the top end portion and two seat width direction end portions of the backboard section since the anchored portion provided to the seat cover is anchored in the cover anchor section that extends along the top end portion and two seat width direction end portions of the backboard section.

A seat backboard according to claim 6 of the present invention is the seat backboard of claim 5 wherein the two seat width direction end sides at a top end side of the cover anchor section are curved in circular arc shapes that are convex towards a top side and the seat width direction outer sides as viewed along a seat front-rear direction.

In the seat backboard of a sixth aspect, the two seat width direction end sides at the top end side of the cover anchor section that extends along the top end portion and two seat width direction end portions of the backboard section are curved in circular arc shapes that are convex towards the top side and the seat width direction outer sides as viewed along the seat front-rear direction. Namely, the cover anchor section is curved in circular arc shapes at coupling portions between locations of the cover anchor section extending along the top end portion of the backboard section and locations of the cover anchor section extending along the two seat width direction end portions of the backboard section, and the seat cover is anchored along the circular arc shaped curved portions. Therefore creases in the seat cover can be prevented or effectively suppressed from occurring compared to cases in which, for example, the cover anchor section is bent at right angles at the coupling portions.

A seat backboard according to a seventh aspect of the present invention is the seat backboard of the first aspect, further integrally including, or substantially integrally including, a resiliently deforming section disposed further to a seat front side than the backboard section, the resiliently deforming section being resiliently deformable under load towards the seat rear side.

The seat backboard of the seventh aspect further integrally includes, or substantially integrally includes, the resiliently deforming section disposed further to the seat front side than the backboard section, the resiliently deforming section being resiliently deformable under load towards the seat rear side. Hence good sitting comfort can be secured for a seated occupant even if seatback springs, such as so-called S-springs, are omitted, and so the configuration of the vehicle seat can be simplified.

A vehicle seat according to eighth aspect of the present invention is a vehicle seat including: a seatback frame; the seat backboard of the first aspect. attached to a pair of left and right side frames of the seatback frame; a seatback pad supported by the seatback frame; and a seat cover covering a surface of the seatback pad and fixed to the cover fixing section of the seat backboard.

In the vehicle seat of the eighth aspect, the seat cover is fixed to the seat backboard attached to the pair of left and right side frames of the seatback frame so as to cover the surface of the seatback pad. The seat backboard is that of the first aspect and so the previously described operation and advantageous effects are obtained.

As explained above, the seat backboard and the vehicle seat according to the present invention can raise the degrees of freedom for design and can simplify the fixing structure of the seat cover.

BEST MODE FOR CARRYING OUT THE INVENTION

Explanation follows regarding an exemplary embodiment of a vehicle seat according to the present invention, with reference to FIG. 1 to FIG. 5. In the drawings the arrow FR indicates a vehicle front side, the arrow UP indicates the vehicle top side, and the arrow IN indicates the vehicle width direction inside as appropriate.

Overall Configuration

Figure 1:
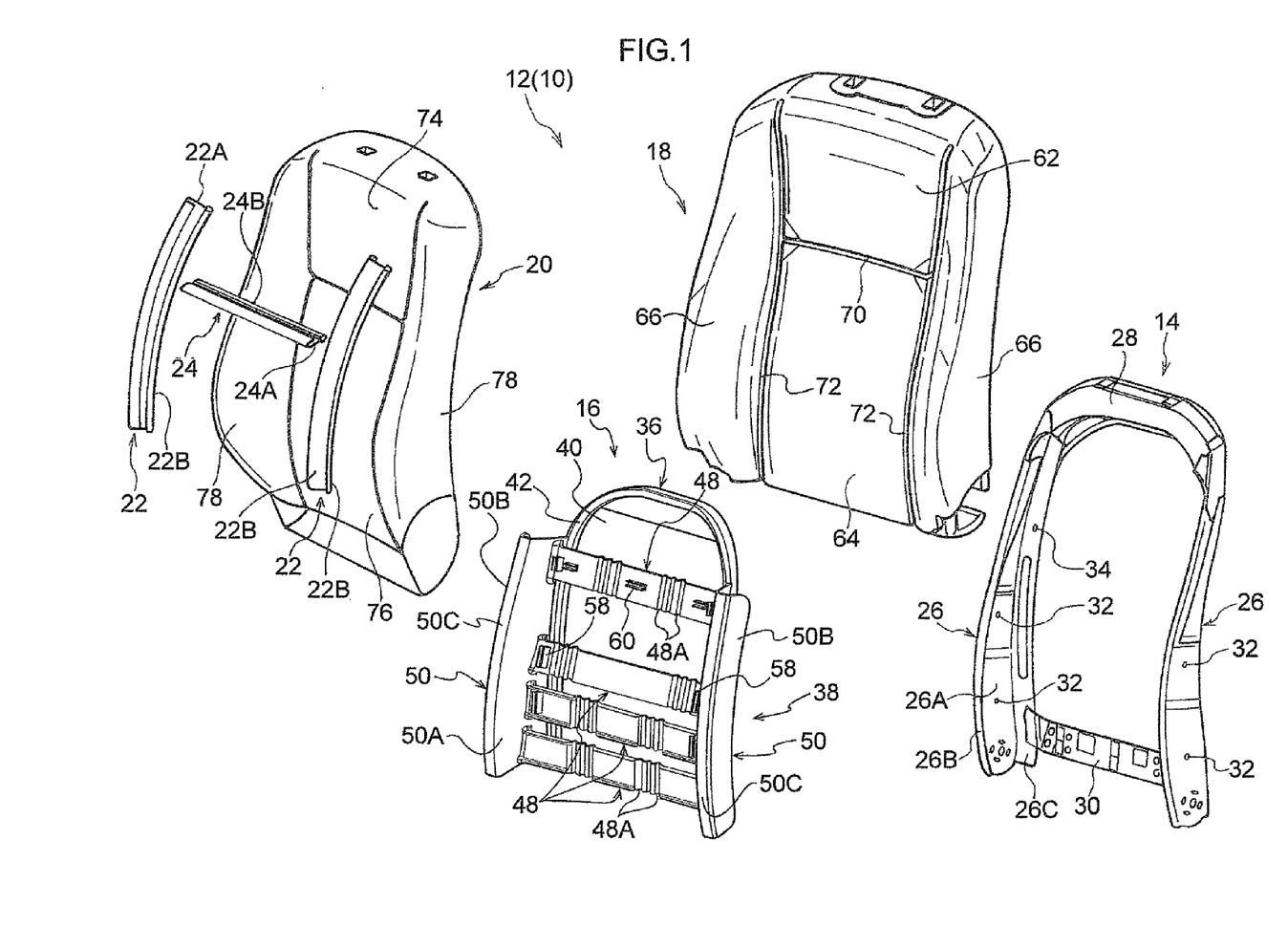
FIG. 1 is an exploded perspective view of a seatback of a vehicle seat according to an exemplary embodiment of the present invention.
Figure 4:
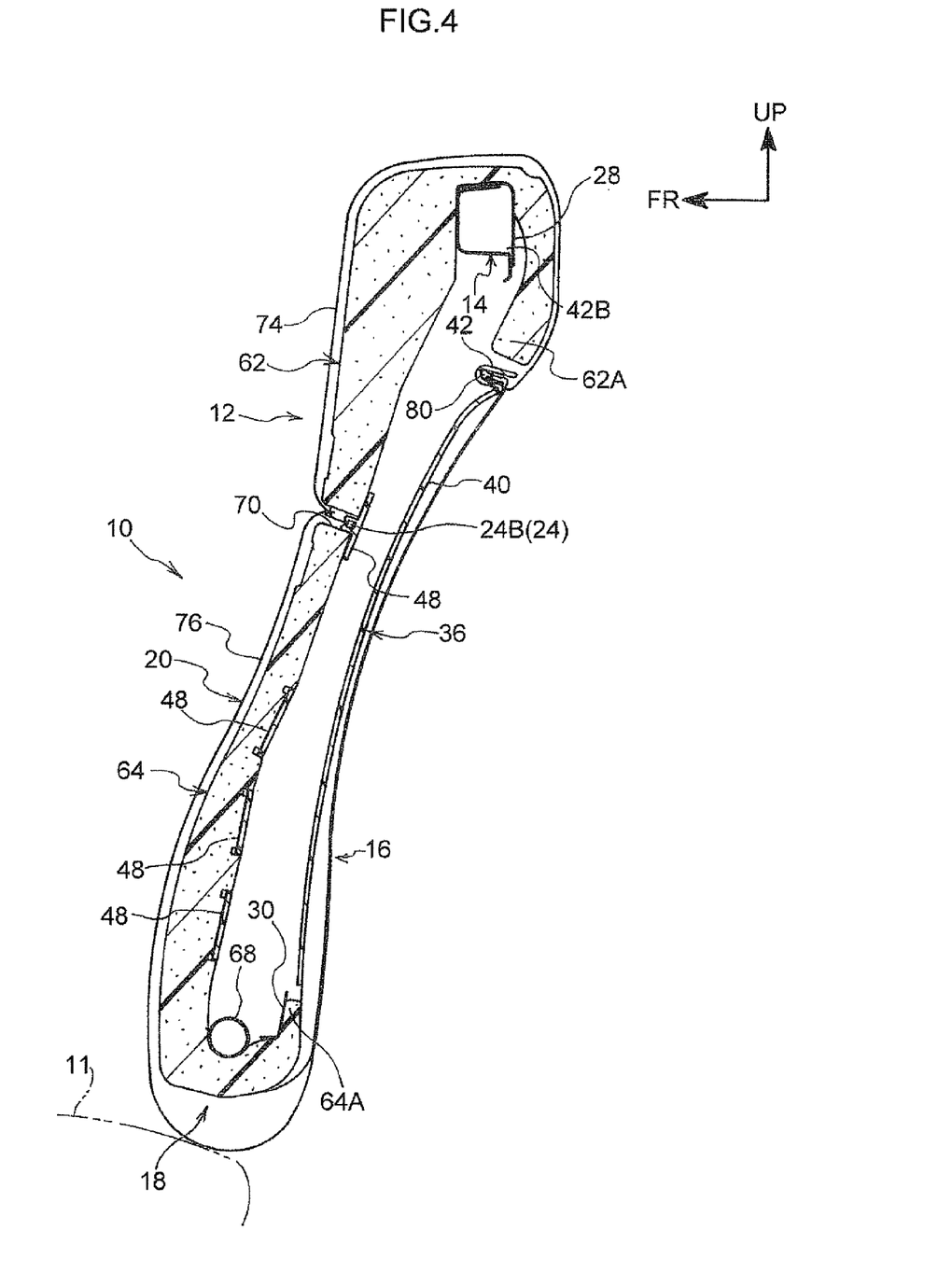
FIG. 4 is an enlarged vertical cross-section illustrating an assembled state of the seatback shown in FIG. 1.
Figure 5:
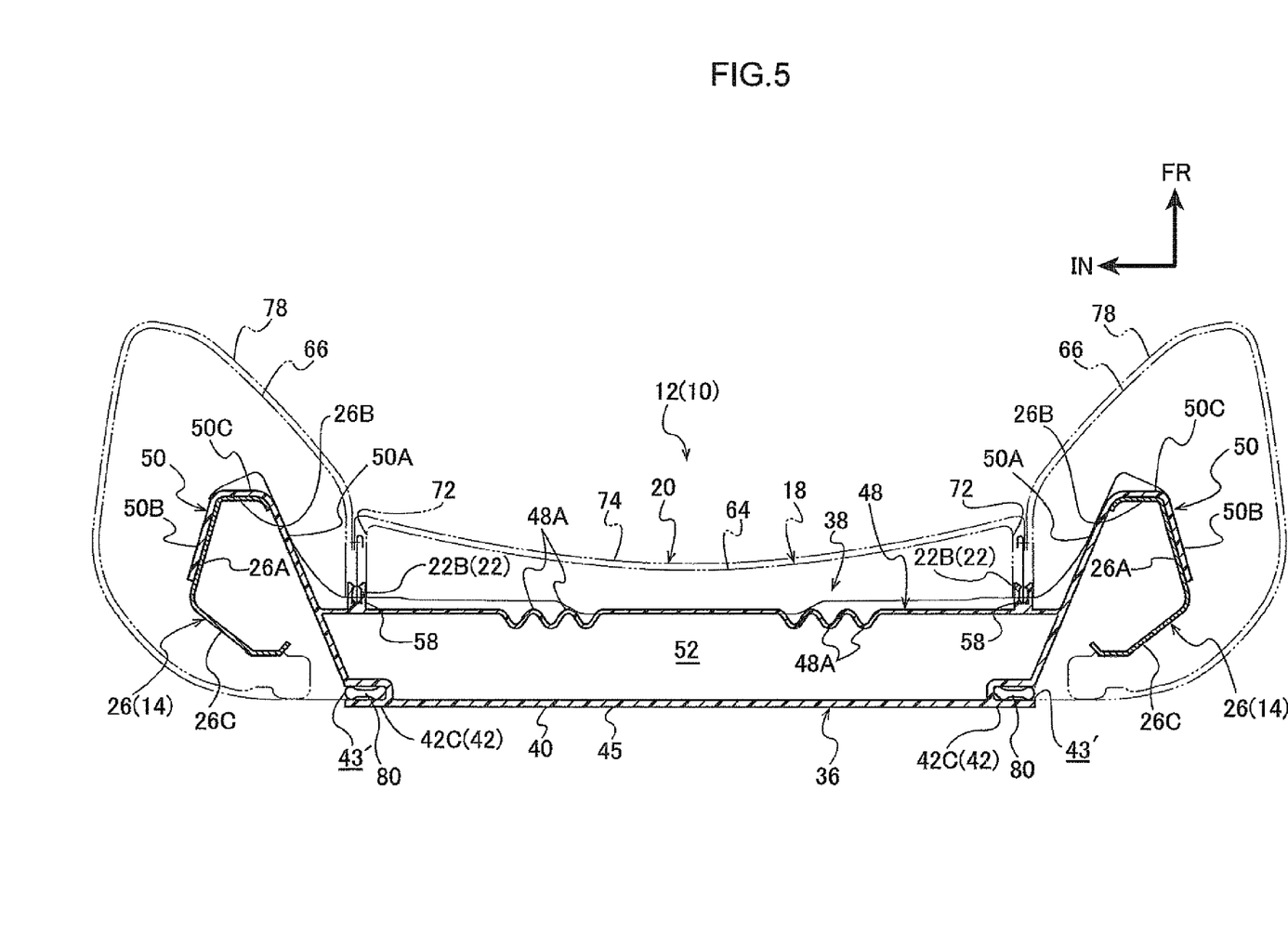
FIG. 5 is an enlarged horizontal cross-section corresponding to FIG. 3 and illustrating a modified example of a seat backboard according to an exemplary embodiment of the present invention.

FIG. 1 is an exploded perspective view of a seatback corresponding to the backrest of a vehicle seat according to the present exemplary embodiment. Note that in FIG. 1 the configuration elements are depicted as viewed from slightly different angles from each other. FIG. 4 is a vertical cross-section of a vehicle seat provided with the seatback. As shown in these drawings, a vehicle seat 10 is configured including a seat cushion 11 for seating an occupant (see FIG. 4), a seatback 12 that is reclinably supported at a rear edge portion of the seat cushion 11, and a headrest supported at a top end portion of the seatback 12 and movable upwards and downwards.

As shown in FIG. 1, the seatback 12 is configured including: a seatback frame 14 that is made from metal and configures a framework member of the seatback 12; a resin spring-integrated backboard 16 mounted to the front face side of the seatback frame 14 (referred to below simply as seat backboard); a seatback pad 18 configuring cushioning material of the seatback 12, attached from the front face side of the seat backboard 16 and supported by the seatback frame 14; a seat cover (skin) 20 that covers the surface of the seatback pad 18 (mainly on the front face); and vertical direction attachment members 22 and a horizontal direction attachment member 24 for attaching the seat cover 20 to the seat backboard 16. Detailed explanation follows regarding each of the configuration elements.

Configuration of the Seatback Frame 14

As shown in FIG. 1 to FIG. 4, the seatback frame 14 is formed in a rectangular frame shape in front view (indicating a view from the front face of the vehicle; in the following explanation the direction of the vehicle and the direction of the vehicle seat 10 are the same as each other). More specifically, configuration includes a pair of left and right side frames 26 disposed facing each other along the seat width direction (the vehicle width direction), an upper frame 28 that is formed in an inverted U-shape and connects together top end portions of the left and right side frames 26, and a lower frame 30 that connects together the bottom end portions of the left and right side frames 26 along the seat width direction. The seatback 12 is manufactured by press forming the four members, including the upper frame 28, however another frame structure may be employed. For example, configuration may be made with just the upper frame configured by pipe material bent into an inverted U-shape, and configuration may be made with pipe material bent into an inverted U-shape for the upper frame and the left and right pair of side frames.

Figure 2:
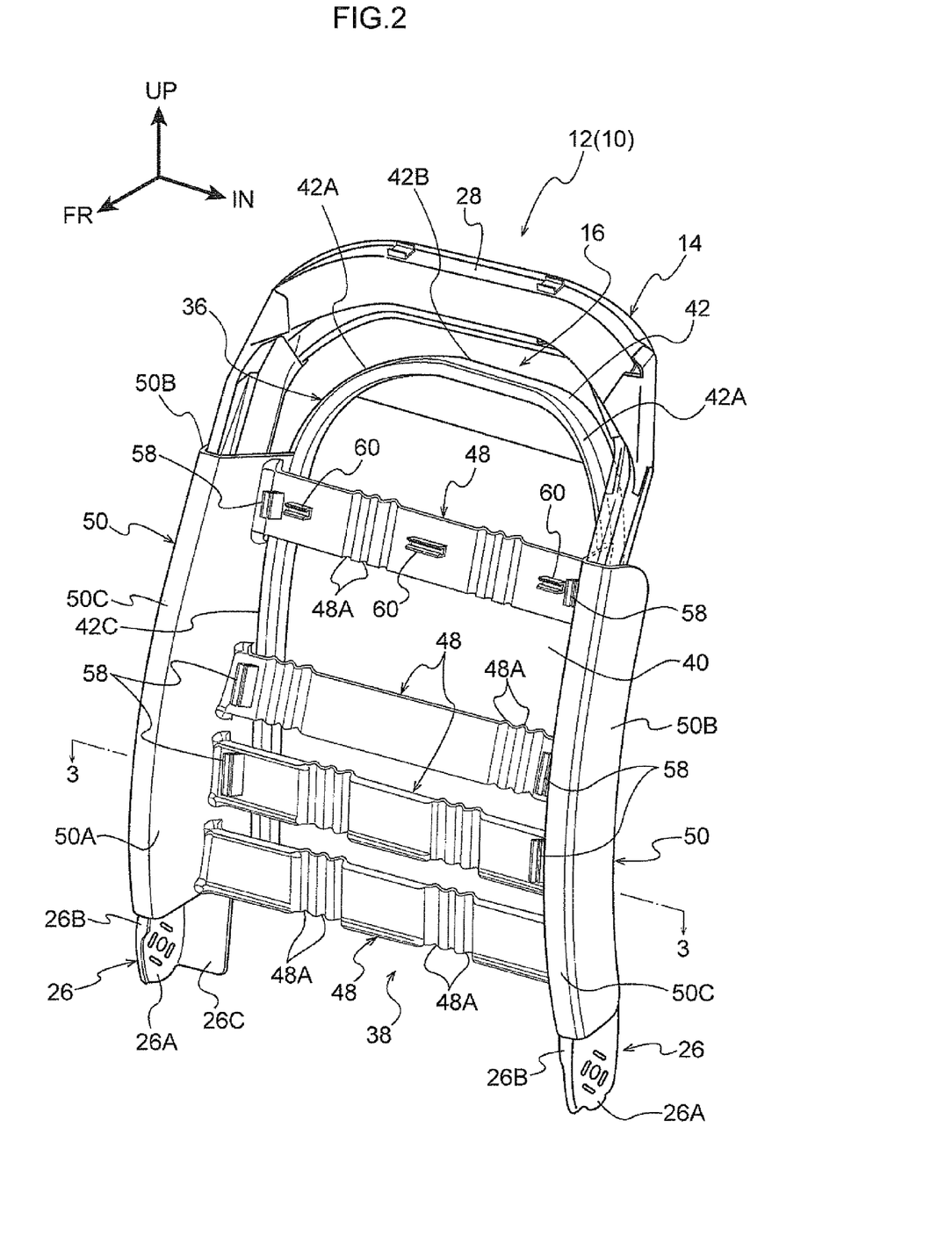
FIG. 2 is a perspective view illustrating an assembled state of the seat backboard to the seatback frame illustrated in FIG. 1.
Figure 3:
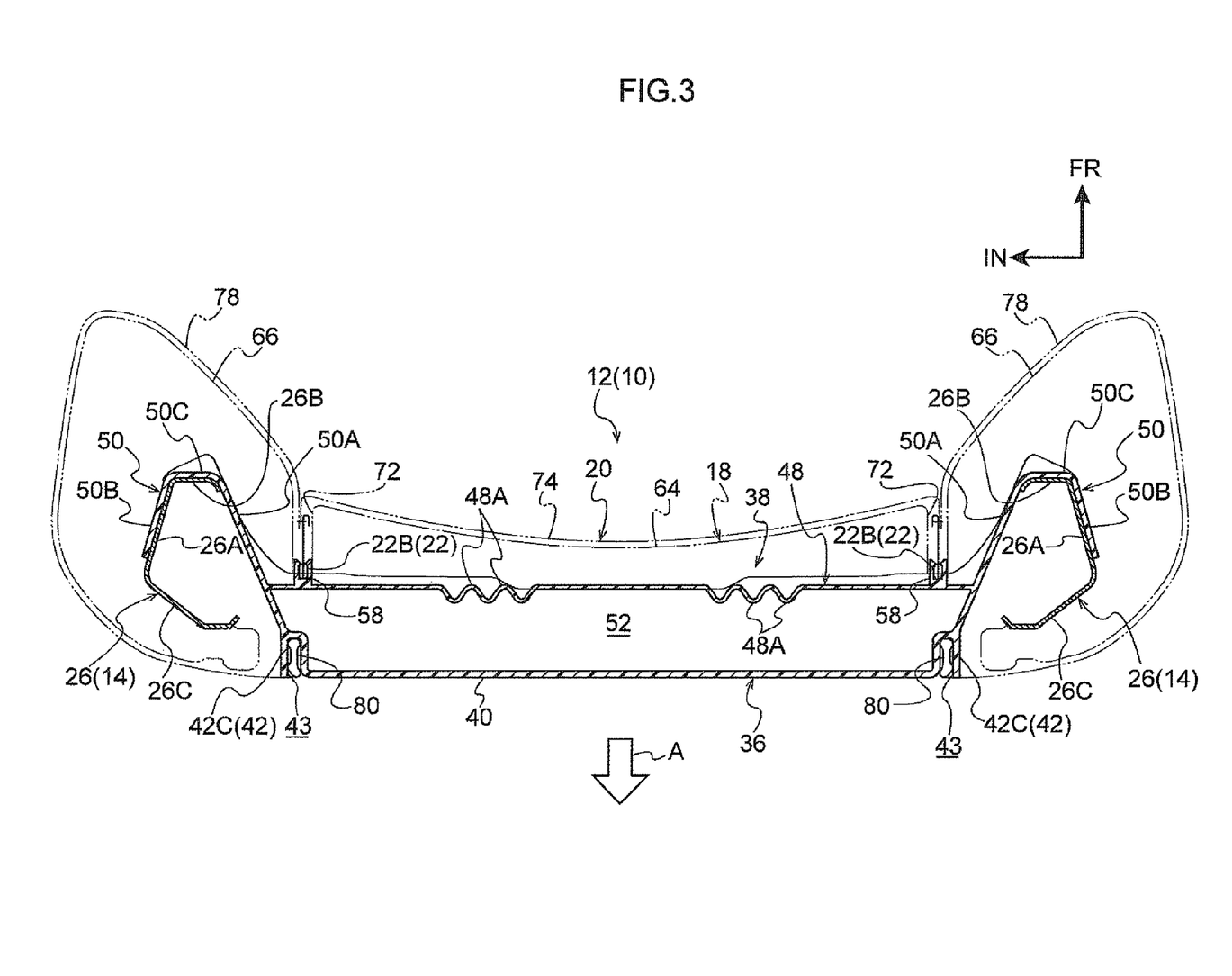
FIG. 3 is an enlarged horizontal cross-section showing an assembled state of a seatback sectioned along line 3-3 of FIG. 2.

Explanation follows regarding the cross-section structure of the left and right side frames 26. As shown in FIG. 1 to FIG. 3, the side frames 26 are configured including a side wall portion 26A, a front wall portion 2613 and a rear wall portion 26C. When viewed singularly, each of the side frames 26 is formed with a substantially C-shaped horizontal cross-section that opens towards the seat width direction inside. The side wall portion 26A has a width that narrows overall on progression from the bottom end portion towards the top end portion. Plural attachment holes 32 (see FIG. 1) separated from each other in the top-bottom direction are formed in a bottom portion of the side wall portion 26A. The side wall portion 26A extends diagonally from the seat width direction outside end portion of the front wall portion 26B towards the seat rear side and seat width direction outside. The rear wall portion 26C extends diagonally from the rear end portion of the side wall portion 26A to the seat width direction inside and seat rear side, with the leading end side of the rear wall portion 26C bent so as to run along the seat width direction. The width of the rear wall portion 26C is set sufficiently wider than the width of the front wall portion 26B.

Configuration of the Seat Backboard 16

Detailed explanation now follows regarding the configuration of the seat backboard 16. As shown in FIG. 1 to FIG. 4 (and in particular FIG. 1 and FIG. 2), the seat backboard 16 is formed from a resin material, integrally equipped with: a backboard section 36 disposed at the back face side of the seatback 12; a pair of left and right coupling fixing sections 50 (frame attachment sections) provided further to the seat width direction outside than the seat width direction two ends of the backboard section 36, coupled to the backboard section 36, and fixed to the pair of left and right side frames 26; and a back spring section 38 (resiliently deforming section) that spans across between the pair of left and right coupling fixing sections 50 and is capable of resilient bowing deformation in the load acting direction (the seat rear side) when load acts towards the seatback rear side.

The backboard section 36 is configured including a board body 40 formed slightly smaller than the seatback frame 14 and a cover anchor section 42 (cover fixing section) integrally formed as a U-shaped groove to locations of the outer peripheral portion of the board body 40 excluding the bottom end portion. Namely, in the present exemplary embodiment the cover anchor section 42 is provided to the backboard section 36. The backboard section 36 is formed slightly smaller than the inner peripheral edge of the opening section of the rectangular frame shape-formed seatback frame 14, and is formed with a size enabling the backboard section 36 to pass through between the left and right side frames 26. Consequently the backboard section 36 can be assembled to the seatback frame 14 from the seat front side. In the assembled state to the seatback frame 14 the backboard section 36 is disposed slightly further to the seat rear side than the rear wall portions 26C of the left and right side frames 26 (see FIG. 3).

The cover anchor section 42 extends continuously along the top end portion and the seat width direction end portions (locations on the outer peripheral portion excluding the bottom end portion) of the backboard section 36 and projects out further to the seat front side than the board body 40. The cover anchor section 42 is formed overall in an inverted substantially U-shape as viewed along the seat front-rear direction, with the top end side of the cover anchor section 42 formed bent into circular arc shapes at the two seat width direction end sides, convex towards the top side and seat width direction outsides as viewed along the seat front-rear direction. Namely, as shown in FIG. 2, the cover anchor section 42 includes curved portions 42A bent into circular arc shapes and configuring coupling portions between a horizontally extending portion 42B that extends in the seat width direction along the top end portion of the backboard section 36, and a pair of left and right vertical extending portions 42C that extend in the seatback height direction along the two seat width direction end portions of the backboard section 36 (the vertical extending portion 42C on the seat left hand side is omitted from illustration in FIG. 2). The cross-section profile of the cover anchor section 42 is a U-shape open towards the seat rear side, with an opening 43 of the cover anchor section 42 and the back face of the board body 40 (the back face of the backboard section 36) disposed in the same plane as each other. The cover anchor section 42 is employed for anchoring (fixing) the outer peripheral portion of the seat cover 20, described later, but also functions to raise the overall surface rigidity of the backboard section 36 that reinforces the plate shaped board body 40.

The back spring section 38 includes plural back spring body sections 48 disposed along the seat width direction. The two end portions in the length direction of each of the back spring body sections 48 are coupled together in the seatback height direction by the pair of left and right coupling fixing sections 50.

In the present exemplary embodiment there are four back spring body sections 48 disposed in the seatback height direction. One of the back spring body sections 48 is disposed at the top portion side of the back spring section 38, and three of the back spring body sections 48 are disposed at the bottom portion side of the back spring section 38 at a specific interval to each other in the seatback height direction. The interval between the back spring body section 48 disposed at the top portion side and the back spring body section 48 disposed at the highest position on the bottom portion side is set to be wider than the disposal intervals between the three back spring body sections 48 referred to above. The reason for thus disposing one of the back spring body sections 48 at the top portion whilst disposing plural (3 in this case) of the back spring body sections 48 at the bottom portion side is that greater support capability is required for the back face lower portion (lumbar region) than to the back face upper portion when an occupant is seated. However, the number of back spring body sections disposed is optional, and configuration may be made with plural back spring body sections disposed at even intervals from the top end portion to the bottom end portion of the back spring section.

Corrugated portions 48A are integrally formed as pairs of left and right bowing portions to the two seat width direction sides of the back spring body sections 48. Note that "two seat width direction sides of the back spring body sections 48" means that the corrugated portions 48A are present as bowing portions on the both the left and right side of a center line passing through the seat width direction central point (midpoint) of the back spring body sections 48. Hence, when the back spring body sections 48 are imparted with a load from a seated occupant acting towards the seatback rear side (the backboard section 36 side), the pair of left and right corrugated portions 48A stretch. As a result the back spring body sections 48 deform by bowing (resiliently deform) towards the backboard section 36 side, this being the direction in which the load is acting.

As shown in FIG. 3, the back spring section 38 described above is disposed at a position to the seat front side of the backboard section 36 and separated by a specific distance therefrom. Namely, a specific gap 52 is formed between the back spring section 38 and the backboard section 36. The back spring body sections 48 are capable of resilient deformation within the range of the gap 52. That is to say, the backboard section 36 functions as a restricting member to restrict the amount of bowing of the back spring section 38 to a specific amount of less.

The coupling fixing sections 50 are formed in inverted substantially U-shapes open towards the seat rear side in horizontal cross-section. The coupling fixing sections 50 are each equipped with an inside side wall 50A that couples together the length direction end portions of top-bottom adjacent back spring body sections 48 and also couples to the backboard section 36; an outside side wall 50B that is disposed at the seat width direction outside of the inside side wall 50A and is anchored in a surface contact state to the outside face of the side wall portion 26A of the side frames 26, and a front wall 50C that couples together the front edge of the inside side wall 50A and the front edge of the outside side wall 50B along the seat width direction, and contacts the front wall portion 26B of the side frames 26 in face contact state. Namely, the coupling fixing sections 50 engage with (in this case contact) the front side of the side frames 26, and are supported by the side frames 26 from the seat rear side. When the seat backboard 16 is assembled to the seatback frame 14, the coupling fixing sections 50 are configured to be attached (fitted) to the side frames 20 from the front side. Note that the definition of "attached to the side frames 26 from the front side" is not limited to cases in which the coupling fixing sections 50 engage with the side frames 26 from the front side, and includes cases in which the side frames 26 engage with the coupling fixing sections 50 from the rear side. Configuration may also be made such that the coupling fixing sections 50 do not directly contact the front side of the side frames 26, and do so through another member interposed between the two.

The coupling fixing sections 50 are fixed to the side frames 26 by the outside side walls 50B thereof being fixed to the attachment holes 32 of the side wall portion 26A of the side frames 26 from the seat width direction outsides by fixing members, not shown in the drawings. Note that various means may be applied as fixing members, such as a configuration in which resin clips (fixing implements) are integrally formed to the outside side wall 50B and engage with the attachment holes 32, or a configuration involving fastening with fasteners such as rivets, screws, or bolts and weld nuts, or a configuration involving bonding with structural adhesive.

Note that in the present exemplary embodiment the uppermost of the back spring body sections 48 to the lowermost of the back spring body sections 48 are coupled together in the seatback height direction by the pair of left and right coupling fixing sections 50, however there is no limitation thereto and the coupling fixing sections 50 may be divided in the seatback height direction. For example, the uppermost disposed back spring body section 48 may be fixed to the side frames 26 at top side coupling fixing portions, and the three back spring body sections 48 disposed at the bottom portion side may be coupled together in the seatback height direction by bottom side coupling fixing sections and fixed to the side frames 26.

Whereas the present exemplary embodiment is configured with a single level (one section) of the back spring body sections 48 at the top portion side, there is no limitation thereto and a configuration with plural levels (plural sections) may be adopted, or a configuration may be adopted in which there are plural levels (plural sections) of the back spring body sections 48 disposed at even intervals across from the top portion to the bottom portion of the backboard section 36.

Configuration of the Seatback Pad 18

As shown in FIG. 1, broadly speaking the seatback pad 18 is configured with a pad central top portion 62, a pad central bottom portion 64, and a pair of left and right pad side portions 66. The seatback pad 18 is made from urethane foam, for example.

As shown in FIG. 4, the vertical cross-sectional profile of the pad central top portion 62 is formed substantially in the shape of an inverted and mirrored letter J. The pad central top portion 62 is anchored from the seatback top side to the upper frame 28 of the seatback frame 14. The vertical cross-sectional profile of the pad central bottom portion 64 is formed substantially in the shape of a mirrored letter J. The pad central bottom portion 64 is shaped in a convex curved shape with a bottom portion that bulges out further to the seat front side than the top portion. The pad central bottom portion 64 is anchored at the seatback bottom side to a connecting rod 68 that couples together the bottom end portions of the side frames 26 across the seat width direction. Note that the connecting rod 68 is disposed parallel to the front side of the lower frame 30 of the seatback frame 14.

As shown in FIG. 3, the horizontal cross-section profile of the pad side portions 66 is formed in a substantially C-shape. The pad side portions 66 are mounted so as to wrap around the side frames 26 in a state with the coupling fixing sections 50 mounted thereto. The pad side portions 66 are formed in protruding curved shapes such that the bottom portions of the pad side portions 66 are in a shape bulging out further to the seat front side than the top portions thereof, and are also in a shape bulging out further to the seat front side than the pad central top portion 62 and the pad central bottom portion 64, securing side support properties for an occupant.

Returning to FIG. 4, the seat backboard 16 described above is disposed to span from a back face side bottom edge portion 62A of the pad central top portion 62 to a back face side top edge portion 64A of the pad central bottom portion 64 when viewed in vertical cross-section. More precisely the back face side top edge portion 64A of the pad central bottom portion 64 is formed thinner than the back face side bottom edge portion 62A, and this thinned portion is disposed overlapping in the front-rear direction with the bottom edge portion of the backboard section 36.

A horizontal direction slit 70 is formed as a through groove for tucking in a cover between the pad central top portion 62 described above and the pad central bottom portion 64. A pair of left and right vertical direction slits 72 are also respectively formed as through grooves for tucking in a cover between the pad central top portion 62 and the pad central bottom portion 64 and the pad side portions 66. The slit widths of the horizontal direction slit 70 and the vertical direction slits 72 are set to lengths such that the vertical direction attachment members 22 and the horizontal direction attachment member 24, described later, are insertable therein. The horizontal direction slit 70 and the vertical direction slits 72 are all formed with straight line shapes, and pass through the seatback pad 18 in the thickness direction (which is also the vehicle front-rear direction).

Configuration of the Seat Cover 20

As shown in FIG. 1, the seat cover 20 is formed with a size capable of covering the seatback pad 18 from the front side. The seat cover 20 is also equipped with a cover central top section 74, a cover central bottom section 76 and a pair of left and right cover side sections 78 to match the sectioned configuration of the seatback pad 18.

Seat Cover 20 Attachment Structure

The seat cover 20 is attached using for example the vertical direction attachment members 22, the horizontal direction attachment member 24, vertical resin claw portions 58, horizontal resin claw portions 60 and outer periphery anchor portions 80 (anchored portions).

As shown in FIG. 1, each of the vertical direction attachment members 22 is configured by an attachment member main body 22A formed in a strap shape, and a resin engagement portion 22B provided at one side edge of the attachment member main body 22A and formed into a wedge shape. The other side edge of the attachment member main body 22A is pre-attached by stitching to the cover central top section 74, the cover central bottom section 76 and the cover side sections 78. The vertical direction attachment members 22 (and the horizontal direction attachment member 24) are depicted in FIG. 1 as being separate from the seat cover 20, however the vertical direction attachment members 22 (and the horizontal direction attachment member 24) are pre-attached to the seat cover 20. The vertical resin claw portions 58 are integrally formed further to the two seat width direction outsides of the corrugated portions 48A of the back spring body sections 48 so as to correspond to the vertical direction attachment members 22. The engagement portions 22B of the vertical direction attachment members 22 are capable of resiliently engaging with the vertical resin claw portions 58. The central portion of the seat cover 20 is then attached in the vertical direction to the seat backboard 16 by resiliently engaging the engagement portions 22B of the pair of left and right vertical direction attachment members 22 with the corresponding vertical resin claw portions 58 of each of the back spring body sections 48.

The horizontal direction attachment member 24 is similarly configured by an attachment member main body 24A formed in a strap shape, a resin engagement portion 24B provided at one side edge of the attachment member main body 24A and formed into a wedge shape. The other side edge of the attachment member main body 24A is pre-attached by stitching to the cover central top section 74 and the cover central bottom section 76. The horizontal resin claw portions 60 are integrally formed to the uppermost disposed back spring body section 48 at a seat width direction central portion and at two seat width direction outside locations, corresponding to the attachment member main body 24A. The engagement portion 24B of the horizontal direction attachment member 24 is capable of resiliently engaging with the horizontal resin claw portions 60. As shown in FIG. 4, the central portion of the seat cover 20 is attached along the horizontal direction to the seat backboard 16 by the engagement portion 24B of the horizontal direction attachment member 24 resiliently engaging with each of the horizontal resin claw portions 60 provided at 3 locations on the uppermost disposed back spring body section 48.

The outer peripheral side of the seat cover 20 is wrapped around the outer peripheral portion of the seatback pad 18 and folded back towards the back face side of the seatback pad 18. Plural elongated outer periphery anchor portions 80 formed with arrowhead shaped cross-sections are attached by sewing to appropriate positions on the outer peripheral portion of the seat cover 20 disposed at the back face side of the seatback pad 18. Note that the length dimension of a single of the plural outer periphery anchor portions 80 is set for example at about 30 mm, and there are for example about 10 of the outer periphery anchor portions 80 attached to the outer peripheral portion of the seat cover 20. The outer periphery anchor portions 80 are disposed in a line in an inverted U-shape along the extension direction of the cover anchor section 42 of the backboard section 36, and are inserted in and anchored to the cover anchor section 42 from the seat rear side. The outer peripheral portion of the seat cover 20 is thereby capable of being detachably anchored to the backboard section 36 (the seat backboard 16). In this state, the locations on the outer peripheral portion of the seat cover 20 where the outside of the cover anchor section 42 is disposed are folded at substantially a right angle towards the outer peripheral outside of the board body 40 (towards the opposite side to that of the board body 40), and disposed substantially in the same plane as the back face of the board body 40.

Operation and Advantageous Effects of the Present Exemplary Embodiment

Explanation follows regarding operation and advantageous effects of the present exemplary embodiment.

The vehicle seat 10 configured as described above is equipped with the seat backboard 16 with the resin-formed back spring section 38 integrally formed to the resin-formed backboard section 36. The seat backboard 16 is mounted from the seat front side to the metal-formed seatback frame 14 when manufacturing the vehicle seat 10.

More specifically, the backboard section 36 formed of a size capable of passing through between the pair of left and right side frames 26 is inserted between the pair of left and right side frames 26 from the seat front side. The pair of left and right coupling fixing sections 50 are then fitted together with the pair of left and right side frames 26 from the seat front side, and fixed to the side frames 26 by fixing members such as resin clips. In this state, the backboard section 36 is disposed at the back face side of the seatback 12. Thus in the present exemplary embodiment, the seat backboard 16 can be attached to the seatback frame 14 from the seat front side, and so the degrees of freedom for design, including for example assembly processes, can be increased.

In the present exemplary embodiment, after the seat backboard 16 has been attached to the seatback frame 14 in this manner, the seatback pad 18 is then mounted to the seatback frame 14 from the seat front side, and then the seat cover 20 is also covered over the seatback pad 18. The vertical direction attachment members 22 and the horizontal direction attachment member 24 have been pre-fixed by sewing to the seat cover 20 in advance. As the seat cover 20 is being covered over the seatback pad 18, the vertical direction attachment members 22 and the horizontal direction attachment member 24 are inserted into the corresponding vertical direction slits 72 and horizontal direction slit 70, and then respectively anchored to the vertical resin claw portions 58 and the horizontal resin claw portions 60. The outer periphery anchor portions 80 of the seat cover 20 are then anchored to the cover anchor section 42 of the backboard section 36. The seat cover 20 is thereby anchored (fixed) to the seat backboard 16. Accordingly, in the present exemplary embodiment, due to provision to the seat backboard 16 of the fixing structure for the seat cover 20, the fixing structure of the seat cover can be greatly simplified in comparison to conventional fixing structures for a seat cover employing, for example hog rings.

As above, in the present exemplary embodiment the seat cover 20 can moreover be anchored to the seat backboard 16 due to engaging the vertical resin claw portions 58, the horizontal resin claw portions 60, and the outer periphery anchor portions 80 provided to the seat cover 20 with the seat backboard 16. The seat cover anchoring operation can accordingly be more simply achieved than in conventional fixing structures for a seat cover employing, for example hog rings.

Furthermore, in the present exemplary embodiment, the outer peripheral portion of the seat cover 20 is anchored through the outer periphery anchor portions 80 to the cover anchor section 42 by inserting the outer periphery anchor portions 80 provided to the outer peripheral portion of the seat cover 20 into the cover anchor section 42 from the seat rear side. The anchoring operation of the seat cover 20 can accordingly be achieved by an extremely simple operation by simply inserting the outer periphery anchor portions 80 into the cover anchor section 42. Moreover, due to the cover anchor section 42 being open towards the seat rear side, when molding the seat backboard 16 such as by injection molding, a cover anchor section can be employed that does not have what is referred so as an undercut in the mold withdrawal direction (see arrow A in FIG. 3) when forming the back face (design face) of the backboard section 36. Good molding properties for the seat backboard 16 can accordingly be achieved.

Furthermore, in the present exemplary embodiment, as shown in FIG. 3, the opening 43 of the cover anchor section 42 into which the outer periphery anchor portions 80 of the seat cover 20 are inserted is disposed in the same plane as the back face of the backboard section 36 (the back face of the board body 40). The step formed between the seat cover 20 and the back face of the backboard section 36 can thereby be made smaller, and a pleasing appearance can be achieved for the back face side of the seatback 12.

In the present exemplary embodiment the cover anchor section 42 extends along the top end portion and the two seat width direction end portions of the backboard section 36, and the outer periphery anchor portions 80 of the seat cover 20 are anchored in the cover anchor section 42. The seat cover 20 can accordingly be neatly anchored along the top end portion and two seat width direction end portions of the backboard section 36. Moreover there are plural of the outer periphery anchor portions 80 provided in a line extending along the cover anchor section 42 (the outer peripheral anchor section is divided into plural portions). Therefore, for example, variation in assembly of the outer periphery anchor portions 80 to the cover anchor section 42 can be better accommodated than in cases in which a single outer periphery anchor portion formed with a similar substantially U-shape as the cover anchor section 42 is inserted and anchored to the cover anchor section 42. Creases in the seat cover 20 resulting from variation in such assembly can accordingly be prevented or effectively suppressed from occurring, and a pleasing appearance can be achieved for the back face side of the seatback 12.

Furthermore, in the present exemplary embodiment the respective coupling portions between the horizontally extending portion 42B and the left and right vertical extending portions 42C of the cover anchor section 42 of the backboard section 36 are configured by the circular arc shaped curved portions 42A, with the seat cover 20 anchored along these curved portions 42A. Therefore creases in the seat cover 20 can be prevented or effectively suppressed from occurring compared to cases in which, for example, the cover anchor section 42 is bent at a right angle at the respective coupling portions.

In the present exemplary embodiment the back spring section 38 that is resiliently deformable by load towards the seat rear side is provided further to the seat front side than the backboard section 36. A seated occupant can accordingly be resiliently supported even in cases where seatback springs, such as so-called S-springs, are omitted, and good ride comfort for the seated occupant can be secured. The configuration of the vehicle seat can thereby be simplified, and a reduction in both weight and cost of the vehicle seat can be achieved.

Supplementary Explanation to the above Exemplary Embodiment

In the above exemplary embodiment the resin-formed back spring section 38 (resiliently deforming section) is integrally formed to the resin-formed backboard section 36, however there is no limitation thereto and the resin-formed back spring section 38 may be integrally provided to the resin-formed backboard section 36. Namely, the backboard section 36 and the back spring section 38 may be manufactured separately and then the two sections integrated together, such as by welding. The back spring body sections 48 and the coupling fixing sections 50 configuring the back spring section 38 may also be manufactured as separate components and then integrated together, such as by welding. Configuration may also be made with the back spring section 38 of the above exemplary embodiment omitted, and a separate resiliently deforming section provided. For example, configuration may be made with a concertina-shaped resiliently deforming section provided to the seat front side of the backboard section 36, such that the resiliently deforming section resiliently deforms in the compression direction under load towards the seat rear side. Furthermore, for example, a resiliently deforming section formed with a trapezoidal shaped cross-section in plan view may be provided to the seat front side of the backboard section 36, such that the resiliently deforming section resiliently deforms under load towards the seat rear side. Namely, any resiliently deforming section suffices that is disposed to the seat front side of the backboard section, is directly or indirectly supported by the seatback frame, and is resiliently deformable under load towards the seat rear side. Moreover, the first to sixth aspects of the invention may be configured with the resiliently deforming section omitted, and with metal seatback springs, configured by so-called S-springs, attached to the seatback frame in place of the resiliently deforming section.

The above exemplary embodiment is configured with the curved portions 42A formed at the two seat width direction ends on the top end side of the cover anchor section 42, namely at the coupling portion between the horizontally extending portion 42B and the left and right vertical extending portions 42C, however the first to fifth aspects of the invention are not limited thereto. A bent portion may be formed to the coupling portions between the horizontally extending portion 42B and the left and right vertical extending portions 42C (the cover anchor section 42 may be configured with a bend at the coupling portion between the horizontally extending portion 42B and the left and right vertical extending portions 42C).

The above exemplary embodiment is also configured with the cover anchor section 42 extending continuously along the top end portion and the two seat width direction end portions of the backboard section 36, however there is no limitation thereto. The cover anchor section 42 may be configured so as to be formed intermittently along the top end portion and the two seat width direction end portions of the backboard section 36. In the first to fourth aspects of the invention the location where the cover anchor section 42 is formed is the top end portion and the two seat width direction end portions of the backboard section 36 however there is no limitation thereto, and appropriate modifications can be made according to such factors as the configuration of the seat cover 20.

Furthermore, in the above exemplary embodiment, configuration is made with the opening 43 of the cover anchor section 42 and the back face of the board body 40 of the backboard section 36 disposed in the same plane, however the first to third aspects of the invention are not limited thereto. Configuration may be made with an opening of a cover anchor section and a back face of a backboard section disposed unaligned in the seat front-rear direction.

Furthermore, the above exemplary embodiment is also configured with the outer periphery anchor portions 80 (anchored portions) inserted from the seat rear side and anchored in the cover anchor section 42 that opens towards seat rear side, however the first and second aspects of the present invention are not limited thereto. For example, as shown in the modified example of FIG. 5, a configuration may be made with outer periphery anchor portions 80 (anchored portions) inserted from the seat width direction side and anchored in the cover anchor section 43' that opens towards the seat width direction outside.

In the above exemplary embodiment the outer periphery anchor portions 80 provided to the seat cover 20 are configured to engage with the cover anchor section 42 (cover fixing section) provided to the seat backboard 16, however the first aspect of the present invention is not limited thereto. Configuration may be made such that a seat cover is fixed to a cover fixing section of a seat backboard with fixings, such as resin clips.

Various other modifications can be implemented to the invention within a range not departing from the spirit of the invention. Obviously the scope of rights to the present invention is not limited by the above exemplary embodiments.

The invention claimed is:

1. A seat backboard for a vehicle seat with a seatback and a seatback frame, the seat backboard comprising:
    a backboard section that is disposed at a back face side of the seatback and that passes between a pair of left and right side frames of the seatback frame;
    a pair of left and right frame attachment sections that protrude outward of the backboard section in a seat width direction, engage with a front side of the pair of side frames, and are supported by the pair of side frames; and
    a cover fixing section that is disposed at the back face side of the seatback and to which a seat cover that covers a front surface of a seatback pad is fixed at a position generally between the side frames,
    wherein the backboard section, the pair of left and right frame attachment sections, and the cover fixing section are one-piece.

2. The seat backboard of claim 1, wherein the cover fixing section is a cover anchor section that is configured to engage with an anchored portion provided to the seat cover.

3. The seat backboard of claim 2, wherein the cover anchor section is open towards a seat rear side and the anchored portion is inserted into and anchored to the cover anchor section from the seat rear side.

4. The seat backboard of claim 3, wherein an opening portion of the cover anchor section and a back face of the backboard section are disposed in the same plane as each other.

5. The seat backboard of claim 2, wherein the cover anchor section extends along a top end portion and two seat width direction end portions of the seat backboard.

6. The seat backboard of claim 5, wherein two seat width direction end sides at a top end side of the cover anchor section are curved in circular arc shapes that are convex towards a top side and the seat width direction outer sides as viewed along a seat front-rear direction.

7. The seat backboard of claim 1, further comprising, a resiliently deforming section disposed further to a seat front side than the backboard section,
    the resiliently deforming section being resiliently deformable under load towards a seat rear side, and
    the resiliently deforming section being integrally formed with the backboard section, the pair of left and right frame attachment sections, and the cover fixing section.

8. A vehicle seat, comprising:
    a seatback frame;
    the seat backboard of claim 1 attached to a pair of left and right side frames of the seatback frame;
    a seatback pad supported by the seatback frame; and
    a seat cover covering a surface of the seatback pad and fixed to the cover fixing section of the seat backboard.

9. The seat backboard of claim 1, wherein the pair of left and right frame attachment sections each comprise a U-shape.

10. The seat backboard of claim 1, further comprising a back spring section that spans a distance between the pair of left and right frame attachment sections.

* * * * *